United States Patent [19]

Keeney

[11] 4,108,375

[45] Aug. 22, 1978

[54] CONTROL DEVICE AND PROCESS FOR HEATING AN INSTALLATION

[75] Inventor: Lawrence V. Keeney, Saddlebrook, N.J.

[73] Assignee: Energy Conservation Devices, Inc., Palisades Park, N.J.

[21] Appl. No.: 796,654

[22] Filed: May 13, 1977

[51] Int. Cl.$^2$ .............................................. F24D 3/02
[52] U.S. Cl. .................................. 237/8 R; 236/1 B; 236/91 F
[58] Field of Search .............. 165/22; 236/91 E, 91 F, 236/91 G, 1 B; 237/8 R

[56] References Cited

U.S. PATENT DOCUMENTS 3,216,662  11/1965  Gerzon .......................... 236/91 F X Primary Examiner—William E. Wayner Attorney, Agent, or Firm—Hammond & Littell

[57] ABSTRACT

A control device and process for heating an installation, having one zone or a plurality of zones, so that a desired temperature within the installation is attained wherein a comparison is made between the heating medium temperature and the temperature outside the installation and the results of said comparison are used to regulate the temperature of the heating medium to the lowest temperature required to maintain the desired temperature in the installation where said heating medium is constantly circulating through at least one zone of said installation and a temperature sensing means in each of said one zone or plurality of zones is activating the circulators used to circulate the thermal fluid within the installation, provided that at least one circulator will operate as long as the heating medium temperature is higher than a predetermined low temperature set point.

17 Claims, 1 Drawing Figure

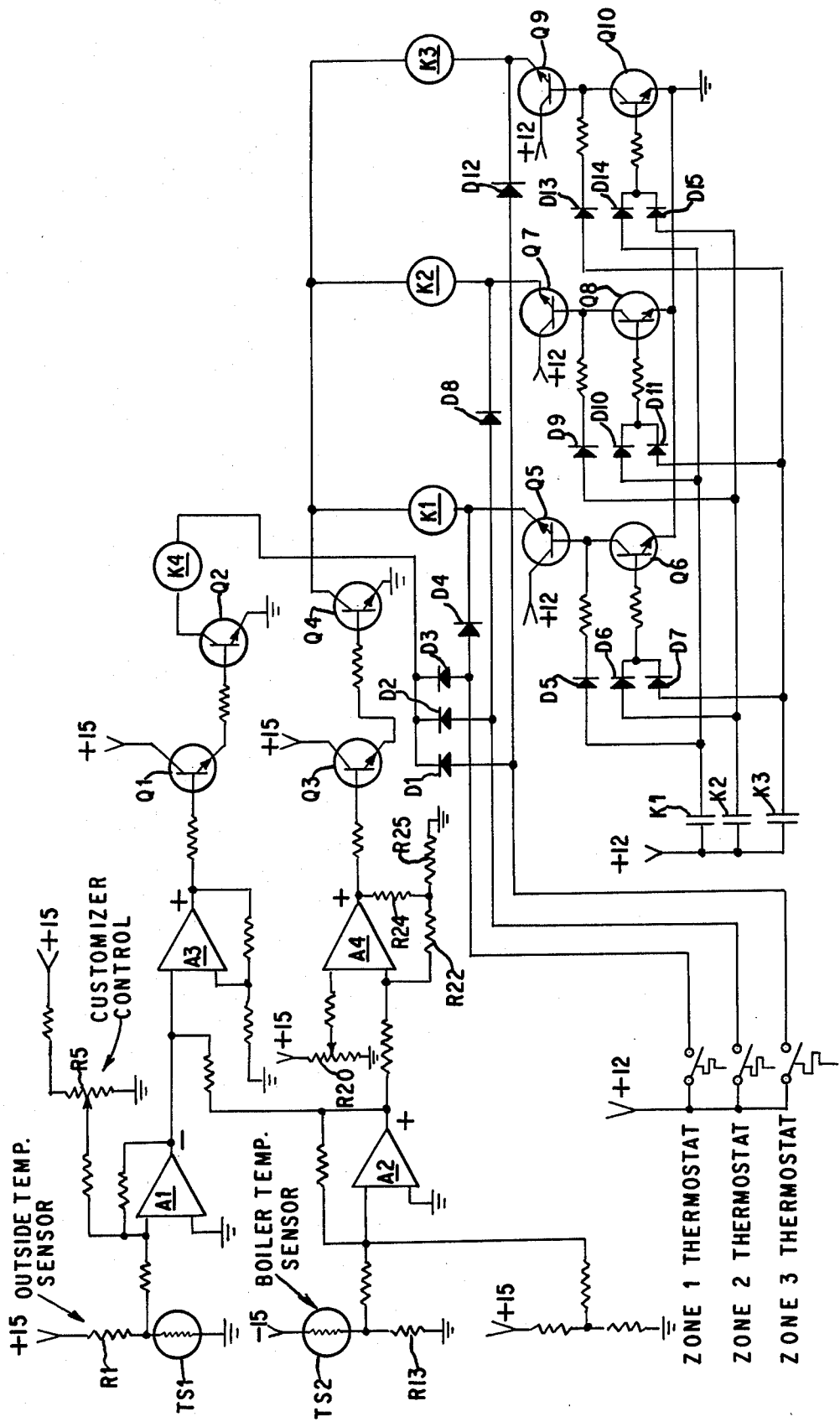

CONTROL DEVICE AND PROCESS FOR HEATING AN INSTALLATION

THE PRIOR ART

This invention relates to systems for controlling the temperature within an enclosure such as a building or the like. Such a system normally comprises a thermal conditioning apparatus, together with control means for regulating the operation of the thermal conditioning apparatus. An objective in such systems is the attainment of an efficient operation in which there is a maximization in energy savings, especially at the present time of scarcity in energy resources.

Through the years, attempts have been made to obtain more heat output vs. energy input in heating systems by various means such as allowing the pump circulating the thermal fluid to run continuously, resetting upper limit furnace (boiler) temperature, etc. Each change from typical home heating conditions made some improvement but except in special cases perhaps, energy savings were not great enough to change the typical hot water heating setup.

These conventional hot water heating systems call for heat in the living areas upon command of the thermostat. On command, the boiler is fired and the circulating pump is started. The boiler will continue to heat water until a high temperature limit, typically of 190° F, is reached. As the water is circulated, it will cool. When the low temperature limit is reached, typically 160° F, the boiler is again fired to heat to the high temperature limit. Meanwhile, the thermostat becomes satisfied. The circulating pump then stops when the heat command from the thermostat is satisfied, leaving the abeyant heat in the boiler and distribution pipes. This abeyant heat and the stack (chimney) losses from this energy have for all practical purposes been lost insofar as heating the living areas is concerned.

In the past much attention has been directed to developing control devices of varying degrees of sophistication for regulating the operation of systems controlling the temperature within an enclosure. Some of the control devices are designed so that a desired temperature is attained at a predetermined time utilizing various signals. U.S. Pat. No. 3,979,059, for example, utilizes a signal representative of the temperature within the enclosure; a signal representative of a given temperature set point related to a predetermined time; and a signal representative of temperature outside the enclosure. A means is provided for heating based on monitoring the relationship between the three above mentioned signals. U.S. Pat. No. 3,747,849 also teaches a control device for a heating installation which determines the outside temperature, the room temperature and the temperature of the heat carrier.

While it has thus been understood that it is advantageous to employ a control apparatus for regulating the temperature of an enclosure, which is responsive to temperatures external to the enclosure, to temperatures within the enclosure and to temperatures of the heating system, there has not been any widespread use of such knowledge. This is because of the complex and relatively expensive control devices of the prior art. Their use has accordingly been limited with the resultant considerable waste in heating a building during periods when only a minimum of heat is required. Illustrative of such a complex device of the prior art is the regulating device disclosed in U.S. Pat. No. 3,216,662 which replaces the conventional room thermostat comprising a bimetal element on which a mercury switch is mounted. The sensing elements of U.S. Pat. No. 3,216,662 are located in complicated bridge circuits. Three temperature dependent elements are employed in the regulating electronic bridge circuits disclosed in U.S. Pat. No. 3,216,662, one to sense the outside air temperature, one to sense the heating system temperature and one to sense the temperature of the area being heated. Since these complex electronic bridge circuits are installed in the areas to be heated, there is a correspondingly greater complexity in the whole heating system the more zones there are to be heated.

OBJECTS OF THE INVENTION

It is an object of the present invention to provide a control over existing heating systems which overcomes the drawbacks of prior art heating systems and achieves a high heat output: heat input ratio.

It is another object of the present invention to provide a heating system through which a significant reduction in the energy cost of heating can be realized by reducing stack losses and increasing use of the abeyant heat in the heating unit.

It is another object of the present invention to provide a simplified and inexpensive control circuit which includes a compact solid state unit of a relatively simple and inexpensive design for installation near the heater.

These and further objects of the present invention will become more apparent as the description thereof proceeds.

THE DRAWING

The FIGURE is a diagram of the control system of the invention.

DESCRIPTION OF THE INVENTION

The present invention relates to a control means for regulating the operation of a circulating fluid medium system for maintaining the desired temperature within an enclosure having one or more circulating zones comprising: first means for sensing the temperature of the circulating medium at the point of heating and the temperature outside the enclosure and making a comparison between the two; second means for controlling the input of heat to the circulating medium based on the results of said comparison between the temperature of the circulating medium at the point of heating and outside temperature to the minimum temperature whereby the demand of temperature within each zone is satisfied; and third means for generating a signal representative of the temperature within any zone in the enclosure, wherein each zone within the enclosure has a separate temperature sensing means and a separate means for circulating said circulating medium, provided that the circulator associated with the zone which last generates a signal representative of a requirement for heat continues to operate as long as the circulating medium temperature is higher than a predetermined temperature set point.

One system for controlling the temperature within an enclosure incorporating a control means in accordance with the invention will now be described, by way of example, with reference to the accompanying FIGURE which discloses a preferred embodiment of the control components of the invention schematically and illustrates the electrical connection of the same.

Resistor R1 and temperature sensor TS1 form a voltage divider. As the outside temperature rises, the voltage out of the voltage divider decreases and as the outside temperature decreases, the voltage out of the voltage divider increases. This voltage is amplified and inverted by amplifier A1. The output of amplifier A1 is a negative voltage, whose value will decrease with a rising temperature and increase with a decreasing temperature. Resistor R13 and temperature sensor TS2 provide a voltage divider whose voltage rises with a rise in boiler temperature and lowers with a decrease in said temperature. This voltage is amplified and inverted in amplifier A2. The output of amplifier A2 is a positive voltage which rises with a rise in boiler temperature and lowers with a decrease in said temperature. Amplifier A4 is a comparator. This comparator compares the output of amplifier A2, which represents the boiler temperature and the output from potentiometer R20. The potentiometer R20 is so adjusted that when the boiler temperature rises to a pre-set temperature, as e.g. 80° F, the comparison results in a positive output of amplifier A4, thus biasing transistors Q3 and Q4 to a conducting mode. Resistors R22, R24, and R25 form a network to provide hysteresis for the amplifier A4 so as to eliminate any noise affecting the operation of the circuit.

When transistors Q3 and Q4 are biased in the conducting mode, this provides a ground path for relays K1, K2, and K3. Should any of the zone thermostats call for heat, the respective relays K1, K2, and K3 will be energized. On the other hand, if the boiler temperature is below the pre-set temperature, transistors Q3 and Q4 will be biased in the open condition and even though the zone thermostats call for heat, relays K1, K2, and K3 will not close.

Amplifier outputs from amplifier A1 and amplifier A2 are combined and fed into amplifier A3. Amplifier A3 senses the presence of a negative voltage when the sum of the voltage from the positive voltage of amplifier A2 and negative voltage of amplifier A1 is itself negative. This negative voltage in amplifier A3 is inverted and the positive voltage output will bias transistors Q1 and Q2 to the conducting mode and provide a ground path for relay K4 when the outside area temperature drops.

Potentiometer R5, the customizer control, is provided to modify the output of amplifier A1. This in effect will allow the boiler temperature to reach a higher value for a given outside temperature. This control is provided so that the system can be tailored to the home being heated or to the individual's requirements for heat.

The control device of the invention also includes circuitry for controlling the zone control pumps. When, for example, the zone one thermostat calls for heat, a path for current flow will be provided through diode D3 which will energize relay K4 and start the burner running, provided that the ground path to relay K4 has been called for by amplifier A3. At the same time, a path is provided through diode D4 to energize relay K1, which will start the zone one pump running, provided, as stated above, that transistors Q3 and Q4 are biased in the closed condition. With relay K1 energized, a path is provided for current through diode D5 to bias transistor Q5 in the conducting mode. This latches relay K1 in the on position. Therefore, even if the zone one thermostat no longer calls for heat and opens, relay K1 will remain in the latched-on position. The zone one pump will then continue to circulate the heated water that is in the boiler through the zone one area until either another zone thermostat calls for heat or until the water in the boiler drops below the pre-set temperature. At this point transistor Q4 is no longer conducting. If the zone two thermostat should now call for heat and the water in the boiler is above the pre-set temperature, a current path will be provided through diode D8 to energize relay K2. When relay K2 energizes, the contacts will provide a path through diode D9 to bias transistors Q7 in the latched-on position. This will latch relay K2 in the on position. At the same time, a path will be provided through diode D6, biasing transistor Q6 on. Biasing transistor Q6 on, shunts the current from the base of transistor Q5 thus turning it off. Relay K1 will now become de-energized. Relay K2 is now the circulator that remains in the on condition, even though the zone two thermostat should not call for heat. Likewise, the zone three thermostat will control relay K3, K3 will be latched on through transistor Q9, etc.

The positive voltage output of amplifier A2 and the negative voltage output of amplifier A1 are so balanced in the system that the boiler water temperature will not exceed a pre-set temperature, e.g. 140° F under ordinary winter temperatures of down to −30° F. Under these conditions the heating of the various zones may be unduly long for some users. In this event the customizer control can be employed as described above.

The control device of the invention, exemplified above, provides substantial energy savings in heating systems. It is designed to provide a 35 to 50% savings of energy input to a hydronic, i.e. hot water, heating system, and at the same time, to supply the heated area with a more constant temperature through the use of a lower temperature heating medium that is continuously circulated. The system achieves this savings by restricting the circulating fluid or boiler water temperature to only that required to heat the area. This is accomplished by sensing the boiler water temperature and the outside temperature, making a comparison between the two, and controlling the burner and circulators based on the results of the comparison.

In addition to controlling the boiler water temperature, the system controls the circulators which in turn control the circulation of the thermal fluid through the system. As each zone thermostat within the enclosure to be heated calls for heat, its respective circulator will run. Anyone or all circulators may be operated at the same time. However, the circulator for the last zone to call for heat will continue to run, even though its zone is not calling for heat. The circulator will continue to run until another zone thermostat calls for heat. At least one circulator will run as long as the boiler water temperature is higher than a pre-set value. This pre-set value is chosen depending on the nature of the heating season in the area where the control device is employed. For example, an advantageous pre-set temperature in the northeastern part of the United States might be for example, 80° F. Thus, when the boiler water temperature in this area drops to 80° F, all pumps are cut off. This will occur at the end of the heating season. At the beginning of the next heating season, the first time that there is a demand for heat, the outside temperature sensor will signal the boiler to fire and, when the boiler water temperature rises to 80° F, the circulators will begin to run. The word "circulator" used above means the device for controlling the flow of thermal fluid in a heating system. It is variously designated depending on the type of heating system used, for example as a zone control pump, solenoid valve, etc. No limitation on the use of the control device of the invention is caused by variations in the types of circulatory systems now used in heating systems. It can, for example, be used in systems where there is an individual pump for each heated zone and for systems where there is a common pump with a number of valves for the various zones. Further, although the FIGURE shows only three zone thermostats and correspondingly only three circulators, control devices with fewer or more than three zone thermostats and circulators are also within the scope of the invention. The invention also includes an operation with only one zone, in which event the circulator is constantly on during the heating season.

The heating unit may be of any type presently used, such as electric, oil, gas, or coal, for heating a space such as a house, office, warehouse, factory or the like. The thermostats are located so as to be affected by the temperature in the space to be heated. A preferred circulating fluid heating medium of the invention is hot water.

While the fuel saving control device of the invention can use thermistors as the temperature indicating or sensing elements in the circuitry, it has been discovered that the precision and reliability of the system is improved if electronic, solid-state temperature sensing devices are used instead. Solid-state silicon sensors have been found to be especially useful. Various other temperature sensing elements can be used in the control device of the invention while still maintaining the efficiency of the system.

A great advantage of the control device of the invention lies in the fact that it can be readily installed in existing heating installations with different heating systems and of different construction.

Only routine installation methods are required for the introduction of the control device of the invention which can be conveniently mounted near or at the heating unit of the system. Thus, the standard thermostat controls, circulatory system, heating unit, electrical circuitry of the system, etc. with all existing safety features, now in place in existing heating installations are susceptible of being easily connected to and regulated by the fuel saving device of the invention. Naturally, additional thermostats or circulators can be employed in any given installation should the heat demands of the facility require it or should the attainment of further energy savings warrant it.

The adaptation of the control device of the invention to an existing heating system basically involves just mounting the control device near the heater and connecting it up to the existing circuits external to it which are already present in the system. Thus, wiring to the conventional thermostats, pumps, solenoids, burner, and existing safeties in the system, for example, can be routinely accomplished by those skilled in the art with little difficulty. When the device of the invention is used to convert a conventional system to achieve higher economy, the interconnection of the device to the existing boiler controls does not modify or bypass any of the safety features of the original system. However, installation of the device does involve the provision of an outside temperature sensing means and a temperature sensing means for the thermal fluid. A standard conversion from the conventional AC line supply to the DC power supply of the unit is made in the control device of the invention. The device of the invention uses direct current sensing signals. This eliminates the problems of stray AC pick-up on the necessary leads to the temperature sensors.

As already stated, the control device of the invention effects a major savings in the energy required to heat an installation by utilizing the thermal fluid of the installation in a most efficient way. As each of the heated zones of the installation demands heat the respective circulators or zone control valves will start and permit the heating medium to flow through the areas being heated. As the demand is satisfied in each of these areas the zone control valves or their respective circulators are shut off. However, heat will continue to be supplied to the last zone to call for it. By continuing to circulate the heating medium to the last zone to call for heat, all or a substantially large amount of the heat that was put into the boiler will be extracted out for use in heating. The temperature of the heating medium will then drop to a very low value. When this temperature drops to the pre-set low temperature value, as e.g. 80° F, the circulator will shut off. A substantial energy savings is thereby provided over that realizable in conventional heating systems. By maintaining the system at a relatively high temperature even though the areas being heated are not calling for heat, the typical present-day heating systems do not conserve energy as does the control device of the invention. Furthermore, in conventional systems, after all zones have been satisfied, all circulating pumps are cut off and the boiler is left with an excess amount of energy that will be dissipated up the stack.

A further advantageous feature of the control device of the invention is the customizer control which matches the present system to any installation that is being heated regardless of the heating losses or the insufficiency of heating in said installation. What the customizer control essentially does is to boost the heating unit temperature up to correct for any insufficiencies in design.

The invention also includes a process for regulating the operation of a circulating fluid medium system for maintaining the desired temperature within an enclosure having one or more circulating zones comprising: (1) sensing the temperature of the circulating medium at the point of heating and the temperature outside the enclosure and making a comparison between the two; (2) controlling the input of heat to the circulating medium based on the results of said comparison between the temperature of the circulating medium at the point of heating and outside temperature to the minimum temperature whereby the demand of temperature within each zone is satisfied; and (3) generating a signal representative of the temperature within any zone in the enclosure, wherein each zone within the enclosure has a separate temperature sensing means and a separate means for circulating said circulating medium, provided that the circulator associated with the zone which last generates a signal representative of a requirement for heat continues to operate as long as the circulating medium temperature is higher than a predetermined temperature set point.

The preceding embodiments are representative of the invention. It is to be understood however that other expedients known to those skilled in the art or disclosed herein may be employed without departing from the spirit of the invention or the scope of the appended claims.

I claim:

1. A control means for regulating the operation of a circulating fluid medium system for maintaining the desired temperature within an enclosure having one or more circulating zones comprising: first means for sensing the temperature of the circulating medium at the point of heating and the temperature outside the enclosure and making a comparison between the two; second means for controlling the input of heat to the circulating medium based on the results of said comparison between the temperature of the circulating medium at the point of heating and outside temperature to the minimum temperature whereby the demand of temperature within each zone is satisfied; and third means for generating a signal representative of the temperature within any zone in the enclosure, wherein each zone within the enclosure has a separate temperature sensing means and a separate means for circulating said circulating medium, and circuit means so connected such that the circulator associated with the zone which last generates a signal representative of a requirement for heat continues to operate as long as the circulating medium temperature is higher than a predetermined temperature set point.

2. The control means of claim 1 wherein an electronic comparison is made between the temperature of the circulating medium at the point of heating and the outside temperature.

3. The control means of claim 2 wherein the electronic comparison is made by a solid-state comparator.

4. The control means of claim 3 wherein the electronic comparison is made by a solid-state silicon comparator.

5. The control means of claim 1 wherein the means for sensing the temperature of the circulating medium at the point of heating and the temperature outside the enclosure are electronic.

6. The control means of claim 5 wherein solid-state electronic temperature sensing means are used for sensing the temperature of the circulating medium at the point of heating and the temperature outside the enclosure.

7. The control means of claim 6 wherein solid-state silicon temperature sensing means are used for sensing the temperature of the circulating medium at the point of heating and the temperature outside the enclosure.

8. The control means of claim 1 wherein an electronic comparison is made between the temperature of the circulating medium at the point of heating and the outside temperature and the means for sensing the temperature of the circulating medium at the point of heating and the temperature outside the enclosure are electronic.

9. The control means of claim 8 wherein the electronic comparison is made by a solid-state comparator and solid-state electronic temperature sensing means are used for sensing the temperature of the circulating medium at the point of heating and the temperature outside the enclosure.

10. The control means of claim 9 wherein the electronic comparison is made by a solid-state silicon comparator and solid-state silicon temperature sensing means are used for sensing the temperature of the circulating medium at the point of heating and the temperature outside the enclosure.

11. The control means of claim 1 which contains an auxiliary control whereby the input of heat to the circulating medium is increased for a given outside temperature.

12. The control means of claim 1 wherein the enclosure has one circulating zone.

13. The control means of claim 12 wherein the circulator is selected from the group consisting of a zone control pump and a solenoid valve.

14. The control means of claim 1 wherein the enclosure has more than one circulating zone.

15. The control means of claim 14 wherein the circulator is selected from the group consisting of a zone control pump, a solenoid valve, and any combination thereof.

16. A process for regulating the operation of a circulating fluid medium system for maintaining the desired temperature within an enclosure having one or more circulating zones comprising: (1) sensing the temperature of the circulating medium at the point of heating and the temperature outside the enclosure and making a comparison between the two; (2) controlling the input of heat to the circulating medium based on the results of said comparison between the temperature of the circulating medium at the point of heating and outside temperature to the minimum temperature whereby the demand of temperature within each zone is satisfied; and (3) generating a signal representative of the temperature within any zone in the enclosure, wherein each zone within the enclosure has a separate temperature sensing means and a separate means for circulating said circulating medium, and continuing to run the circulator associated with the zone which last generates a signal representative of a requirement for heat as long as the circulating medium temperature is higher than a predetermined temperature set point.

17. The process of claim 16 wherein the circulating fluid medium is hot water.

* * * * *